A. W. NEFF.
TIRE PROTECTOR.
APPLICATION FILED FEB. 25, 1916.
1,211,214.  Patented Jan. 2, 1917.
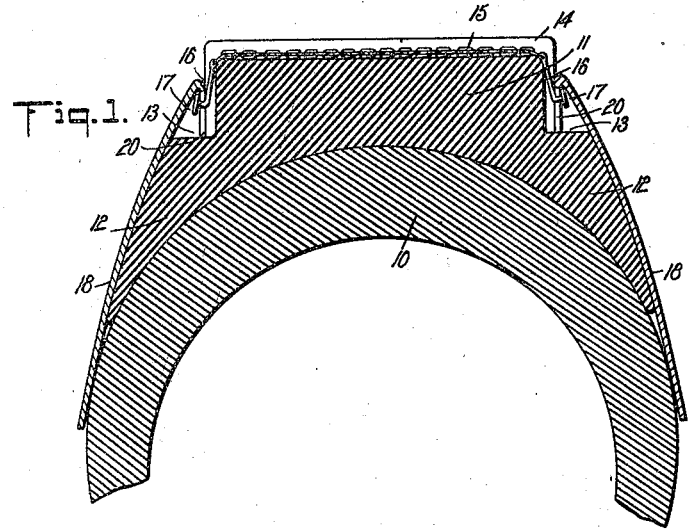
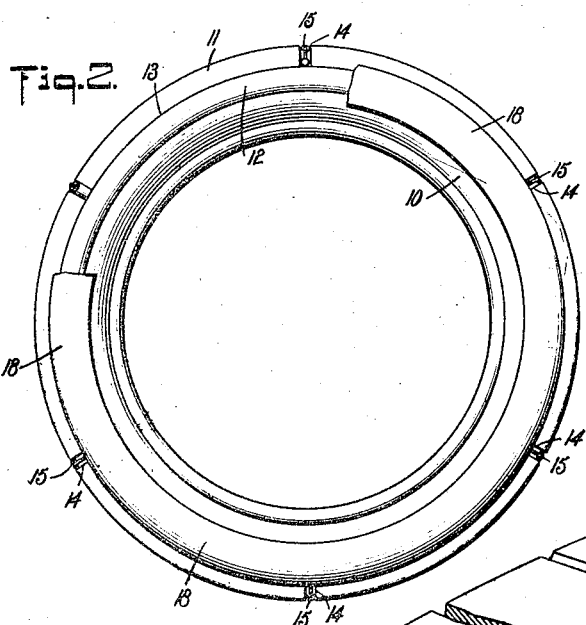
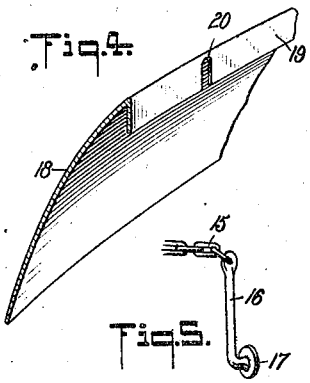
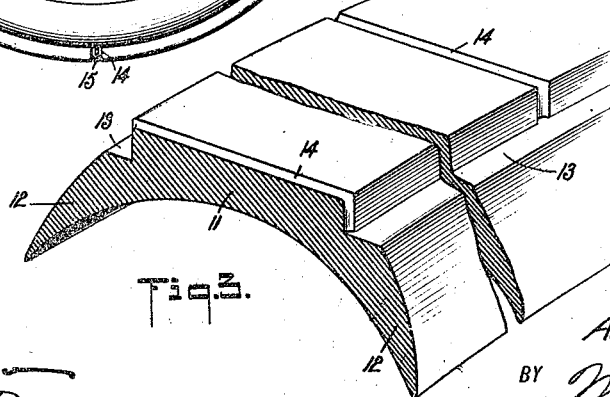
WITNESSES
INVENTOR
A.W. Neff
BY
ATTORNEYS

UNITED STATES PATENT OFFICE.

AMBROSE W. NEFF, OF POWELL, OHIO, ASSIGNOR OF ONE-HALF TO GEORGE W. NEFF, OF NEW YORK, N. Y.

TIRE-PROTECTOR.

1,211,214. Specification of Letters Patent. Patented Jan. 2, 1917.

Application filed February 25, 1916. Serial No. 80,390.

*To all whom it may concern:*

Be it known that I, AMBROSE W. NEFF, a citizen of the United States, and a resident of Powell, in the county of Delaware and State of Ohio, have invented a new and Improved Tire-Protector, of which the following is a full, clear, and exact description.

The object of the invention is to provide a new and improved tire protector arranged to prolong the life of the tire, to prevent punctures and blow-outs, to insure the desired cushioning effect with comparatively little air pressure in the tire, to reduce the tendency to skid to a minimum, and to allow the use of a broad tread on a tire of small diameter.

In order to accomplish the desired result, use is made of a tread, preferably of rubber or other suitable elastic material, and fitting the peripheral face of the tire, the tread being provided at its sides with ledges, and the peripheral face of the tread being provided with transverse grooves leading to the ledges, flexible connections extending in the said grooves, and ring-shaped protecting plates overlying the sides of the tread and extending onto the sides of the tire, the said plates being detachably connected with the said flexible connections.

A practical embodiment of the invention is represented in the accompanying drawings forming a part of this specification, in which similar characters of reference indicate corresponding parts in all the views.

Figure 1 is an enlarged cross section of the tire protector as applied, the view showing a portion of a tire. Fig. 2 is a reduced side elevation of a tire provided with the protector, a portion of one of the protecting plates being shown broken out; Fig. 3 is a sectional perspective view of a portion of the tread; and Fig. 4 is a sectional perspective view of a portion of one of the protecting plates; and Fig. 5 is a perspective view of one end of one of the flexible connections.

Onto the peripheral face of an inflatable tire tube 10 fits a tread 11, preferably made of rubber or other similar elastic material. The tread 11 is provided with integral sides 12 forming at their outer ends ledges 13, as plainly indicated in the drawings. The peripheral face of the tread 11 is provided with transversely extending grooves 14 terminating at the ledges 13, and in the said grooves are arranged flexible connections 15, preferably in the form of chains, terminating at their ends in shanks 16 provided with buttons 17.

The sides 12 of the tread 11 are overlaid with ring-shaped protecting plates 18, preferably made of metal, and extending inward beyond the inner edges 12 to overlie the sides of the tire tube 10, as plainly indicated in Figs. 1 and 2. The outer or peripheral edges of the protecting plates 18 terminate in inwardly extending return bent flanges 19 seated on the ledges 13 and provided with notches 20 engaged by the buttons 17 of the flexible connections 15 to securely hold the ring-shaped protecting plates 18 in position on the sides 12 of the tread 11, the inner edges of the plates extending on the sides of the tire tube 10 to near the middle thereof.

It will be noticed that the flexible connections 15 are sufficiently deep in the grooves 14 to be protected against wear.

It will also be noticed that by the arrangement described the plates 18 protect the sides 12 of the tread 11 as well as the sides of the tire tube 10, and hence the latter is not liable to be punctured and blow-outs are prevented.

It will further be noticed that the tire tread 11 with its protecting plates 18 does not prevent the cushioning of the tire tube 10, and owing to the broad face of the tread 11 skidding is prevented.

It will also be noticed that a broad tread may be used on a comparatively small sized tire tube 10. The ledge 13 provides sufficient space for accommodating the flange 19 and the button connection between the flange and the flexible connection 15, as will be readily understood by reference to Fig. 1.

Having thus described my invention, I claim as new and desire to secure by Letters Patent:

1. A tire protector, comprising a tread adapted to fit the peripheral face of a tire and provided at the sides with ledges, the peripheral face of the tread being provided with transverse grooves leading to the said ledges, flexible connections extending in the said grooves and ring-shaped protecting plates overlying the sides of the tread and extending onto the sides of the tire, the said plates being provided at their outer edges with flanges resting on the said ledges, and detachably connected with the ends of the said flexible connections.

2. A tire protector, comprising a tread adapted to fit the peripheral face of a tire and provided at the sides with ledges, the peripheral face of the tread being flattened and provided with transverse grooves leading to the said ledges, flexible connections extending in the said grooves and terminating at the said ledges, ring-shaped protecting plates overlying the sides of the said tread and extending inward onto the sides of the tire, the outer edges of the said plates having inward return bent flanges seated on the said ledges, and means for connecting the ends of the said flexible connections with the said flanges.

In testimony whereof I have signed my name to this specification in the presence of two subscribing witnesses.

AMBROSE W. NEFF.

Witnesses:
E. S. MENDENHALL,
VINTON L. GRACE.